United States Patent [19] [11] Patent Number: 4,814,102
Baur et al. [45] Date of Patent: Mar. 21, 1989

[54] DETERGENTS CONTAINING OXYALKYLATED, CARBOXYL-CONTAINING POLYMERS

[75] Inventors: Richard Baur, Mutterstadt; Walter Denzinger, Speyer; Albrecht Eckell, Frankenthal; Heinrich Hartmann, Limburgerhof; Josef Mueller, Grosskarlbach; Hans-Juergen Raubenheimer, Ketsch; Wolfgang Trieselt, Ludwigshafen, all of Fed. Rep. of Germany

[73] Assignee: BASF Aktiengesellschaft, Ludwigshafen, Fed. Rep. of Germany

[21] Appl. No.: 175,176

[22] Filed: Mar. 31, 1988

[30] Foreign Application Priority Data

Apr. 3, 1987 [DE] Fed. Rep. of Germany ....... 3711296

[51] Int. Cl.$^4$ ............................................... C11D 17/00
[52] U.S. Cl. .................... 252/174.24; 252/82; 252/174.21; 252/180; 252/541; 252/DIG. 11; 252/DIG. 15
[58] Field of Search ...................... 252/82, 174.24, 180, 252/DIG. 11

[56] References Cited

U.S. PATENT DOCUMENTS

| 2,484,487 | 10/1949 | Caldwell | 560/209 |
|---|---|---|---|
| 2,723,248 | 11/1955 | Wright | 525/205 |
| 3,330,765 | 7/1967 | Hoornstra | 156/659.1 |
| 3,459,720 | 8/1969 | Grosser | 526/212 |
| 3,880,765 | 4/1975 | Watson | 252/8.554 |
| 3,907,934 | 9/1975 | Dall'Asta | 525/220 |
| 3,935,174 | 1/1976 | Velker | 526/229 |
| 4,002,811 | 1/1977 | Hendy | 526/59 |
| 4,190,569 | 2/1980 | Kroker | 524/376 |
| 4,338,202 | 7/1982 | Louboutin | 210/795 |
| 4,341,647 | 7/1982 | Hunter | 252/8.554 |
| 4,403,071 | 9/1983 | Hunter | 525/330.4 |
| 4,559,159 | 12/1985 | Denzinger et al. | 252/174.24 |
| 4,647,396 | 3/1987 | Denzinger et al. | 252/174.24 |
| 4,673,721 | 6/1987 | Krakkay et al. | 526/329.3 |
| 4,746,456 | 5/1988 | Kud et al. | 252/174.24 |

FOREIGN PATENT DOCUMENTS 3233777 3/1984 Fed. Rep. of Germany .

OTHER PUBLICATIONS

Kirk Othmer, vol. 1, 3rd Ed., pp. 348, 354.
Encyclopedia of Polymer Science & Engineering, 2nd Ed., vol. 1, pp. 245 and 305.

Primary Examiner—A. Lionel Clingman
Attorney, Agent, or Firm—Joseph D. Michaels

[57] ABSTRACT

Detergents which contain from 0.01 to 20% by weight of oxyalkylated, carbonyl-containing polymers can be prepared by reacting.

(A) a polymer which contains, as copolymerized units, one or more monoethylenically unsaturated $C_3$–$C_6$-carboxylic acids with (B) ethylene oxide, propylene oxide, n-butylene oxide, isobutylene oxide or a mixture of these, in an aqueous medium at up to 150° C.

8 Claims, No Drawings

DETERGENTS CONTAINING OXYALKYLATED, CARBOXYL-CONTAINING POLYMERS

U.S. Pat. No. 3,880,765 discloses the preparation of oxyalkylated, water-soluble polymers of acrylic acid. In a process variant described in the U.S. Patent, polymers of acrylic acid are reacted with from 2 to 60% by weight, based on the polymer used, of an alkylene oxide, preferably ethylene oxide, in an aqueous medium. The oxyalkylated polymers which can be prepared in this manner are neutralized, for example with sodium hydroxide solution, and are used in amounts of from 10 to 100 ppm, occasionally up to 500 ppm, in oil production in order to prevent deposition from water onto metallic surfaces.

It is an object of the present invention to provide an additive for detergents which acts as a builder and has a very high dispersing power for pigment dirt in the wash liquor.

We have found that this object is achieved, according to the invention, by the use of oxyalkylated, carboxyl-containing polymers which can be prepared by reacting (A) a polymer which contains, as monomeric units, one or more monoethylenically unsaturated $C_3$–$C_6$-carboxylic acids with (B) from 3 to 80% by weight, based on the polymer (A), of ethylene oxide, propylene oxide, n-butylene oxide, isobutylene oxide or a mixture of these, in an aqueous medium at up to 150° C., as an additive in detergents in amounts from 0.1 to 20% by weight.

Suitable polymers (A) are homopolymers of monoethylenically unsaturated $C_3$–$C_6$-carboxylic acids or copolymers which contain, as monomeric units, not less than 20% by weight of a monoethylenically unsaturated $C_3$–$C_6$-carboxylic acid. Suitable monoethylenically unsaturated carboxylic acids of this type are, for example, acrylic acid, methacrylic acid, ethacrylic acid, vinylacetic acid, allylacetic acid, propylideneacetic acid, ethylidenepropionic acid, mesaconic acid, fumaric acid, methylenemalonic acid, citraconic acid, maleic acid and itaconic acid. Among the stated carboxylic acids, acrylic acid, methacrylic acid, maleic acid, fumaric acid, itaconic acid or a mixture of these is preferably used.

Other suitable polymers (A) are copolymers of (a) monoethylenically unsaturated $C_3$–$C_6$-monocarboxylic acids and (b) monoethylenically unsaturated dicarboxylic acids of 4 to 6 carbon atoms.

Preferably used monomers of group (a) are acrylic acid and/or methacrylic acid. Examples of monomers of group (b) are maleic acid, itaconic acid, mesaconic acid, fumaric acid, methylenemalonic acid and citraconic acid. Maleic acid is preferably used from this group of monomers. The copolymers contain, as copolymerized units, from 1 to 99% by weight of the monomers of group (a) and from 99 to 1% by weight of the monomers of group (b).

The carboxyl-containing copolymers can be modified by copolymerization with further monomers. Copolymers of this type contain, as monomers, (a) from 5 to 40% by weight of one or more monoethylenically unsaturated $C_3$–$C_6$-monocarboxylic acids, preferably acrylic acid and/or methacrylic acid, (b) from 5 to 40% by weight of one or more monoethylenically unsaturated dicarboxylic acids of 4 to 6 carbon atoms, preferably maleic acid and/or itaconic acid, (c) from 0 to 80% by weight of one or more hydroxy-$C_2$–$C_6$-alkyl esters of mono- or dicarboxylic acids according to (a) and (b) and (d) from 0 to 20% by weight of one or more amides or nitriles of mono- or dicarboxylic acids according to (a) and (b) or of one or more esters of a monohydric $C_1$–$C_4$-alcohol with the said acids, vinyl acetate, vinyl propionate, vinyl-phosphonic acid, vinyl sulfonate and/or acrylamido-2-methylpropanesulfonic acid.

The sum of the percentages by weight (a) to (d) is always 100. Examples of suitable monomers (c) are hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate, monohydroxyethyl maleate, hydroxyethyl maleate, monohydroxypropyl maleate, dihydroxypropyl maleate, monohydroxybutyl maleate, dihydroxybutyl maleate, monohydroxyethyl itaconate, dihydroxyethyl itaconate, monohydroxypropyl itaconate, dihydroxypropyl itaconate and monohydroxybutyl itaconate. Among the hydroxyalkyl esters which are derived from diols 3 to 6 carbon atoms, all isomers can be used. Preferably used monomers of group (c) are hydroxyethyl acrylate, hydroxyethyl methacrylate, hydroxypropyl acrylate, hydroxybutyl acrylate and hydroxypropyl methacrylate. The monomers of group (c) are preferably present in the copolymers in an amount of from 20 to 60% by weight.

Examples of suitable components (d) are acrylamide, methacrylamide, acrylonitrile, methacrylonitrile, acrylates of alcohols of 1 to 4 carbon atoms, e.g. methyl acrylate, ethyl acrylate, n-propyl acrylate, isopropyl acrylate, n-butyl acrylate, isobutyl acrylate and tertbutyl acrylate, and the corresponding esters of methacrylic acid and monoesters of dicarboxylic acids, such as monomethyl maleate, dimethyl maleate, monoethyl maleate, mono-n-propyl maleate, diisopropyl maleate, mono-n-butyl maleate, mono-sec-butyl maleate, di-n-propyl maleate, di-n-butyl maleate and di-sec-butyl maleate, and the corresponding esters of fumaric acid and itaconic acid, vinyl acetate, vinyl propionate, vinylphosphonic acid, vinylsulfonic acid and/or acrylamido-2-methylpropanesulfonic acid. If the copolymers are modified with monomers of group (d), the amount of monomers of group (d) in the copolymers is up to 20, preferably from 5 to 15, % by weight.

The abovementioned homo- and copolymers have weight average molecular weights of from 500 to 1 million, preferably from 10,000 to 500,000. The polymers are characterized below by the Fikentscher K value, instead of the molecular weight. The K value of the homo- and copolymers is from 8 to 200, preferably from 15 to 100. It is determined according to H. Fikentscher in 1% strength aqueous solution at pH 7, 25° C. and a polymer concentration of the sodium salt of the polymer of 1% by weight.

The polymers (A) described above, which contain not less than 20% by weight of a monoethylenically unsaturated $C_3$–$C_6$-carboxylic acid as monomeric units, are reacted, in the form of the free acid groups or in partially neutralized form, with alkylene oxides in an aqueous medium. If, apart from carboxyl groups, the polymers (A) do not contain any functional groups which react with the alkylene oxides, the maximum degree of neutralization is 70 mol %. However, if the polymers A contain not only carboxyl groups but also, for example, hydroxyl groups, all the carboxyl groups of these polymers can also be neutralized. In this case, the alkylene oxides are added at the hydroxyl groups of the copolymers. The polymers (A) are preferably subjected to the oxyalkylation in the form of the free acids, for which purpose they are dissolved in an aqueous medium. The polymer concentration is from 5 to 90, preferably from 20 to 70, % by weight. A preferably used aqueous medium is pure water, for example river water freed from suspended substances, demineralized water or distilled water. Other suitable aqueous media are mixtures of water and solvents which are water-soluble, for example alcohols, such as methanol, ethanol, n-propanol and isopropanol, acetone, dimethylformamide, dioxane and tetrahydrofuran. The water-miscible solvents are used especially when the polymers (A) do not dissolve completely in water. Of course, it is also possible to use mixtures of organic solvents and water as the aqueous medium. The content of organic solvent in the solvent mixtures can be up to 50% by weight.

The polymers of group (A) are reacted with the alkylene oxides mentioned above under (B). These alkylene oxides are ethylene oxide, propylene oxide, n-butylene oxide, isobutylene oxide or mixtures of the stated alkylene oxides. The reaction of the polymers with the alkylene oxides is carried out in an aqueous medium at from 5° to 150° C., preferably from 10° to 80° C., under atmospheric or superatmospheric pressure. If the reaction is carried out under superatmospheric pressure, the pressures are up to 50 bar. The reaction is usually carried out under up to 20 bar. The alkylene oxide or a mixture of the alkylene oxides is subjected to an addition reaction with the polymers. Small amounts of diols are formed as byproducts. The diol formation, which results from the addition reaction of water with the alkylene oxides, can be suppressed by carrying out the reaction of the polymers (A) and the alkylene oxides (B) in the presence of from 0.5 to 5% by weight, based on the alkylene oxides used, of thioethers or SH-containing compounds. Examples of suitable thioethers are those of the general formula $R—S—R^1$, where R and $R^1$ are each $C_1$–$C_{10}$-alkyl, $—C_6H_5$, $—CH_2—C_6H_5$, $—CH_2—COOH$, $_2—CH—(CH_{2n}—COOH$ or $—(CH_2)_n—CH_2—OH$, and n is from 1 to 8. Examples of such thioethers are dimethyl sulfide, diethyl sulfide, methyl phenyl sulfide, thiodiacetic acid, thiodibutyric acid, ethylthioethanol and thiodiglycol. Thioglycol, thioethanol, thioacetic acid, thiobutyric acid and dodecyl mercaptan are also suitable. The pH of the reaction mixture at 20° C. is not more than 6, preferably from 0.5 to 5. In the case of the hydroxyl-containing polymers, pH >6 may also be used. The reaction is preferably carried out under superatmospheric pressure. The procedure used is as follows: either some or all of the polymers (A) is dissolved in the aqueous medium and the solution initially taken in a pressure vessel, after which some or all of the alkylene oxide is forced in. In order to permit the heat of reaction to be removed readily, the alkylene oxide is metered in a little at a time or continuously at the rate at which the reaction progresses. Advantageously, thorough mixing of the components is ensured during the entire duration of the reaction, for example by stirring. Autoclaves which are equipped with a stirrer and with heating and cooling means are preferably used. It is sometimes advantageous to add the alkylene oxide at a low temperature and then to increase the temperature to complete the reaction, for example to meter in the alkylene oxide at 40° C. and then to allow the reaction to continue at 80° C. When the reaction is complete, oxyalkylated carboxyl-containing polymers are obtained and can be used directly in detergents, in this form or after neutralization. However, the reaction products can also be isolated from the aqueous solution and incorporated in solid form, for example as pellets or flakes, into detergent formulations.

The oxyalkylated carboxyl-containing polymers are neutralized using, for example, sodium hydroxide solution, potassium hydroxide solution, ammonia or an amine, for example a $C_1$–$C_{18}$-alkylamine, such as ethylamine, propylamine, butylamine, dibutylamine, hexylamine, stearylamine, ethanolamine, morpholine, diethanolamine or triethanolamine.

Up to 80, preferably from 20 to 60, mol % of the carboxyl groups of the polymers (A) are reacted with the alkylene oxides. This proportion corresponds to an amount of from 3 to 80, preferably from 6 to 60, % by weight, based on polymers (A), of alkylene oxides.

The oxyalkylated carboxyl-containing polymers are added to detergents in an amount from 0.1 to 20, preferably from 1 to 15, % by weight. In wash liquors, they act as builders and incrustation inhibitors and as dispersants for dirt particles which are detached from the textile material and are present in the wash liquor.

The oxyalkylated, carboxyl-containing polymers can be added, according to the invention, to both phosphate-containing and phosphate-free detergents. The phosphorus-containing detergents have a reduced phosphate content of less than 25% by weight of sodium triphosphate. The oxyalkylated polymers are added to the detergent formulation in the form of a solution or as a mixture with other components, for example together with standardizing agents, such as sodium sulfate, or builders (zeolites) or other assistants. The products to be used according to the invention can be added to both detergent powders and liquid detergent formulations.

Commercial detergent powders which either contain sodium triphosphate or are phosphate-free possess, as an important component, surfactants, e.g. $C_8$–$C_{12}$-alkylphenol oxyethylates, $C_{12}$–$C_{20}$-alkanol oxyethylates, and block copolymers of ethylene oxide and propylene oxide. The polyalkylene oxides are solids from room temperature to 50° C. and readily soluble or dispersible in water. They are linear or branched reaction products of ethylene oxide with propylene oxide and/or isobutylene oxide, which have a block structure or may have a random structure. The terminal groups of the polyalkylene oxides can, if required, be blocked, i.e. the free OH groups of the polyalkylene oxides can be etherified and/or esterified and/or aminated and/or reacted with isocyanates.

Anionic surfactants, such as $C_8$–$C_{12}$-alkylbenzenesulfonates, $C_{12}$–$C_{16}$-alkanesulfonates, $C_{12}$–$C_{16}$-alkylsulfates, $C_{12}$–$C_{16}$-alkanesulfosuccinates and sulfated oxyethylated $C_{12}$–$C_{16}$-alkanols are also suitable components of detergent powders. The detergent powders may furthermore contain polycarboxylic acids or their salts, for example tartaric acid or citric acid. The detergent powders usually contain from 5 to 20% by weight of surfactants.

Another important component of detergent formulations comprises incrustation inhibitors. These substances are, for example, homopolymers of acrylic acid, methacrylic acid and maleic acid or copolymers, for example copolymers of maleic acid and methacrylic acid, copolymers of maleic acid and acrylic acid or copolymers of acrylic and/or methacrylic acid and acrylates, methacrylates, vinyl esters, allyl esters, itaconates, itaconic acid, methylenemalonic acid, methylenemalonates, crotonic acid or crotonates. Other suitable copolymers are those obtained from maleic acid and olefins of 2 to 18 carbon atoms and/or $C_1$-$C_4$-alkyl vinyl ethers. The molecular weight of the homo- and copolymers is from 1,000 to 100,000. The incrustation inhibitors are used in an amount of from 0.5 to 10% by weight in detergents, and are employed in the unneutralized form, as an alkali metal or ammonium salt or in partially neutralized form, for example where from 40 to 60% of the carboxyl groups are neutralized.

Other possible components of detergents are corrosion inhibitors, monomeric, oligomeric and polymeric phosphonates, ether sulfates based on unsaturated fatty alcohols or their alkali metal salts. Detergent powders may alternatively also contain zeolites. If zeolites are used, the amount of the latter is from 5 to 30% by weight, based on the total detergent formulation. The detergent formulations can also contain bleaching agents in an amount of from 3 to 25% by weight, for example sodium perborate, as well as bleach activators, plasticizers, antifoams, perfume, optical brighteners and enzymes. Standardizing agents, such as sodium sulfate, may be present in the detergent in an amount of up to 40% by weight.

The oxyalkylated carboxyl-containing polymers to be used according to the invention can also be employed as additives for liquid detergents. The liquid detergents contain, as essential components, surfactants which are solid or liquid at room temperature and are soluble or dispersible in the detergent formulation. Suitable surfactants for this purpose are the products which have also been used in detergent powders, as well as liquid polyalkylene oxides and polyoxyalkylated compounds. The surfactant content of liquid detergents can be from 5 to 50%, depending on the type of liquid detergent.

The oxyalkylated polymers to be used according to the invention exhibit, both in phosphate-free and phosphate-containing detergent formulations, an action which is similar to that of the most effective commercial polymeric incrustation inhibitors and moreover have a greatly improved dispersing power for the dirt particles detached from the wash during washing.

In the Examples which follow, parts and percentages are by weight. The K values of the carboxyl-containing copolymers were measured according to H. Fikentscher, Zellulosechemie, 13 (1932), 58–64 and 71–74, in aqueous solution at 25° C., at a polymer concentration of 1% by weight of the sodium salt and at pH 7; $K = k \cdot 10^3$. The Fikentscher K-value is an art recognized and accepted indication of relative molecular weights of polymers and is described in "Vinyl and Related Polymers" by Schidlkneckt, John Wiley and Sons, New York 11, N.Y. 1952, at page 676.

EXAMPLES

Preparation of the oxyalkylated, carboxyl-containing polymers

The polymer solution stated in Table 1 and the catalyst likewise noted there are introduced into a 6 l autoclave capable of being heated and cooled and equipped with a stirrer and metering apparatuses. The autoclave is then closed so that it is pressure-tight. Thereafter, nitrogen is forced in three times until a pressure of 4 bar is reached, the autoclave being let down after each feed process. The autoclave is then brought to a nitrogen pressure of 2 bar, and the autoclave content is heated to the reaction temperature stated in the Table. After the reaction temperature has been reached, the alkylene oxide stated in Table 1 is metered in via a pressure vessel. The resulting heat of reaction is removed by cooling the autoclave. The reaction is substantially complete about a ¼ of an hour after the end of the alkylene oxide addition. The stirred autoclave content is then heated for a further 2 hours, after which the reaction mixture is cooled to give, in each case, an aqueous solution, whose solids content is determined by drying for 2 hours at 150° C. in a drying oven. The alkylene glycol contents in the reaction mixture, which are likewise shown in Table 1, were determined by gas chromatography.

TABLE 1

| Polymer No. | Amount [g] | Carboxyl-containing polymer used | Alkylene oxide [g] | Catalyst [g] | Temp. [°C.] | Feed time for alkylene oxide [h] |
|---|---|---|---|---|---|---|
| 1 | 2147 | Copolymer of 50% by weight of AA and 50% by weight of MA, 50% neutralized with NaOH, 42.6% strength solution in water, pH = 4.5, K value: 54 | 155 PO | 3.1 thiodiglycol | 80 | 0.5 |
| 2 | 2009 | Copolymer of 70% by weight of AA and 30% by weight of MA, 30% neutralized with NaOH, 45.3% strength solution in water, pH = 3.9 K value: 66 | 246 PO | 4.9 ethylthioethanol | 30 | 2 |
| 3 | 2107 | Copolymer of 50% by weight of AA and 50% by weight of MA, 50.5% strength solution in water, pH = 0.7, K value: 20 | 321 PO | 6.5 thiodiacetic acid | 35 | 2.5 |
| 4 | 3529 | Copolymer as for Polymer 2 | 518 BuO | 10.5 thiodiglycol | 45 | 5 |
| 5 | 2107 | Copolymer as for Polymer 3 | 244 EO | 4.5 thiodiglycol | 45 | 2.5 |

| Polymer No. | Appearance of solution of oxyalkylated polymer | Solids content [%] of the solution | pH of the solution | K value of the oxyalkylated polymer | Alkylene glycol formed as by-product [%] |
|---|---|---|---|---|---|
| 1 | yellow, clear, viscous | 45.2 | 4.9 | 56 | 2.6 propylene glycol |
| 2 | yellowish, clear, viscous | 49.9 | 4.3 | 69 | 3.3 propylene glycol |
| 3 | yellow, clear, viscous | 53.6 | 1.2 | 18 | 3.4 propylene glycol |
| 4 | yellowish, clear, | 50.6 | 4.3 | 72 | 2.6 1,2-n- |

TABLE 1-continued

| | | | | | |
|---|---|---|---|---|---|
| 5 | viscous yellow, clear, viscous | 52.3 | 0.9 | 17.5 | butylene glycol 2.1 ethylene glycol |

MA: maleic acid
AA: acrylic acid
EO: ethylene oxide
PO: propylene oxide
BuO: 1,2-n-butylene oxide The polymers 1 to 5 to be used according to the invention are subjected to the test methods (1) to (4) described below. The measurement results obtained are summarized in Table 2.

(1) Determination of the dispersing capacity for calcium phosphate and for calcium diphosphate Principle of measurement:

The inhibiting effect of complex formers or dispersants on the precipitation of calcium phosphate or diphosphate is determined by turbidity titration. The substance to be investigated is initially taken, and titrated in the presence of sodium phosphate or diphosphate with calcium acetate solution. The end point is indicated by the formation of the calcium phosphate or diphosphate precipitate. By using a sufficient amount of phosphate/diphosphate, it is possible to ensure that the measurement gives a correct result even when the effect is based not only on complexing of the calcium ions but also on dispersing of calcium phosphate or diphosphate. If in fact the amounts of phosphate used are too small, there is a danger that the dispersing power of the product will not be exhausted; in this case, the end point of the titration is indicated by precipitation of the calcium salt of the product.

During the titration, the change in the light transmission is monitored either visually or with the aid of a lightguide photometer. In the latter case, a light beam passed into the solution via glass fibers is reflected by a mirror, and the intensity of the reflected light is measured.

Reagents:
4.4% strength calcium acetate solution
sodium phosphate
or sodium diphosphate
1N sodium hydroxide solution
1% strength HCl Procedure:

0.5 g of active substance (a.s., calculated as Na salt) are dissolved in 100 ml of distilled water, after which 0.5 g of sodium phosphate or diphosphate is added. The pH is brought to the desired value and is kept constant during the titration. Standard conditions at room temperature (RT) and pH 11.0.

Titration is carried out against 4.4% strength calcium acetate solution at a feed rate of 1 ml/min, until permanent turbidity is obtained, or, in the case of automatic titration (Titroprocessor), at 0.4 ml/min.

In the case of automatic titration, the first point of deflection of the titration curve is the end point.

Calculation:

$$\frac{\text{mg of calcium phosphate or diphosphate}}{\text{g of a.s.}} = \text{consumption of calcium acetate solution} \times 52$$

(2) Testing the incrustation inhibition by turbidity measurement

Wash liquors become cloudy when stored at elevated temperatures, as a result of precipitation of sparingly soluble detergent components. The final turbidity after 2 hours is a measure of the precipitation-inhibiting activity of the incrustation inhibitors.

A phosphate-free model wash liquor prepared using 6.5 g/l of detergent and having the following composition is used for the test:

2.7% by weight of sodium $C_{12}$-alkylbenzenesulfonate
3.2% by weight of the adduct of 25 moles of ethylene oxide with 1 mole of tallow fatty alcohol,
10.8% by weight of Na metasilicate,
27.0% by weight of sodium carbonate,
2.1% by weight of CMC (carboxymethylcellulose),
3% by weight of polymer and
51.2% by weight of sodium sulfate.

Storage at elevated temperatures is effected at 90° C. in water of 22.4° German hardness (Ca:Mg=3:1) over a period of 2 hours.

The turbidity measurement is carried out by nephelometry [low turbidity values (NTU) denote effective products and high values not very effective products].

(3) Testing the dispersing power for pigment dirt 0.1 g of pigment dirt consisting of
86% of kaolin,
8% of lamp black,
4% of iron oxide black and
2% of iron oxide yellow are dispersed together with 3 g (a.s.) of polymer in 100 ml of water of 20° German hardness (Ca:Mg=3:1) for 1 minute in a dispersing apparatus at 2,000 rpm. The dispersion is then stored at RT for 21 days in a cylinder.

The stability of the dispersion is assessed visually and is rated according to the following scale:
very good: 100% dispersion
good: 75% dispersion
satisfactory: 50% dispersion
sufficient: 25% dispersion
insufficient: 0% dispersion, settled out (4) Testing the incrustation inhibition in the wash test To test the efficiency of the polymers, a series of 10 washes were carried out in a Launder-o-meter, and the changes in the ash content were used as a measure of the efficiency of incrustation inhibition.

Test conditions

Liquor: 250 ml
Liquor ratio: 1:12.5
Water hardness: 22.4° German hardness (Mg)
Duration: 30 minutes
Temperature: 35°–60° C. (temperature program)
Test fabric: 10 g of gray cotton cloth + 10 g of cotton cheesecloth terry towelling Detergent: 8 g/l
Composition:
  14.8% of Na $C_{12}$-alkylbenzenesulfonate (50% strength aqueous solution),
  4.6% of the adduct of 7 moles of EO with $C_{13/15}$-fatty alcohol,
  2.8% of soap,
  23.1% of zeolite,
  11.1% of sodium carbonate,
  5.6% of Na metasilicate,
  0.9% of Mg silicate,
  18.5% of sodium perborate,
  9.3% of sodium sulfate and
  9.3% of polymer

TABLE 2

| Example No. | Test method | (1) Calcium phosphate dispersing power (mg $Ca_3(PO_4)_2$ / g a.s.) | (2) Calcium diphosphate dispersing power (mg $Ca_2P_2O_7$ / g a.s.) | (2) Test of incrustation inhibition by turbidity measurement [NTU] | (3) Test of dispersing power for pigment dirt | Incrustation in Launderometer % ash Cotton cheesecloth | Incrustation in Launderometer % ash Terry-towelling |
|---|---|---|---|---|---|---|---|
| 1 | Polymer 1 | 759 | 213 | 180 | very good | 1.68 | 3.30 |
| 2 | Polymer 2 | 2392 | 286 | 160 | very good | 2.05 | 3.84 |
| 3 | Polymer 3 | 910 | 244 | 130 | good | 1.54 | 4.10 |
| 4 | Polymer 4 | 2028 | 255 | 180 | very good | 2.03 | 4.17 |
| 5 | Polymer 5 | 1394 | 192 | 160 | good | 1.78 | 3.65 |
| Comp. Ex. 1 | Commercial incrustation inhibitor (copolymer of maleic acid and acrylic acid) | 104 | 152 | 270 | insufficient | 1.61 | 4.01 |
| Comp. Ex. 2 | no additive | — | — | — | — | 3.97 | 8.03 |

The polymers 1 to 5 used according to the invention give substantially reduced ash values in phosphate-free formulations in wash tests, in combination with greatly improved dispersing power for the dirt particles detached from the wash, compared with the commercial incrustation inhibitor. In reduced-phosphate formulations too, the said polymers give reduced ash values which are comparable with the values obtained using the stated commercial polymeric incrustation inhibitor. Surprisingly, however, the dispersing power of the novel oxyalkylated polymers for calcium phosphate and calcium diphosphate is also greatly improved.

We claim:

1. A detergent comprising, as an added builder, an oxyalkylated, carboxyl-containing polymer which can be prepared by reacting
   (A) polymers which contain, as monomeric units, one or more monoethylenically unsaturated $C_3$–$C_6$-carboxylic acids and
   (B) from 3 to 80% by weight, based on the polymers (A), of ethylene oxide, propylene oxide, n-butylene oxide, isobutylene oxide or a mixture of these,
in an aqueous medium at up to 150° C., the builder simultaneously being an incrustation inhibitor and a dispersant for dirt particles in the wash liquor, and being present in the detergent in amounts of from 0.1 to 20% by weight.

2. A detergent as claimed in claim 1, wherein the polymer (A) used is a homopolymer of a monoethylenically unsaturated $C_3$–$C_6$-carboxylic acid.

3. A detergent as claimed in claim 1, wherein the polymer (A) used is a copolymer of
   (a) monoethylenically unsaturated $C_3$–$C_6$-monocarboxylic acids and
   (b) monoethylenically unsaturated dicarboxylic acids of 4 to 6 carbon atoms.

4. A detergent as claimed in claim 1, wherein the polymer (A) used is a copolymer of
   (a) from 5 to 40% by weight of one or more monoethylenically unsaturated $C_3$–$C_6$-monocarboxylic acids,
   (b) from 5 to 40% by weight of one or more monoethylenically unsaturated dicarboxylic acids of 4 to 6 carbon atoms,
   (c) from 0 to 80% by weight of one of more hydroxy-$C_2$–$C_6$-alkyl esters of mono- or dicarboxylic acids according to (a) and (b) and
   (d) from 0 to 20% by weight of one or more amides or nitriles of mono- or dicarboxylic acids according to (a) and (b) or of one or more esters of monohydric $C_1$–$C_4$-alcohols with the said acids, vinylphosphonic acid, vinylsulfonic acid, vinyl acetate, vinyl propionate and/or acrylamido-2-methylpropanesulfonic acid,
the sum of the percentages by weight (a) to (d) always being 100.

5. A detergent as claimed in claim 1, wherein the oxyalkylated carboxyl-containing polymers can be prepared by reacting (A) and (B) in the presence of from 0.5 to 5% by weight, based on the alkylene oxides (B) used, of thioethers of SH-containing compounds.

6. A detergent as claimed in claim 1, wherein the oxyalkylated polymers have a K value of from 8 to 200 (determined according to H. Fikentscher in aqueous solution at pH 7, at 25° C. and at a polymer concentration of the Na salt of 1% by weight).

7. The detergent as claimed in claim 1, wherein the oxyalkylated polymers have a K value of from 15 to 100 (determined according to H. Fikentscher in aqueous solution at pH 7, at 25° C. and at a polymer concentration of the Na salt of 1% by weight).

8. A detergent as claimed in claim 1, wherein the alkali metal and/or ammonium salts of oxyalkylated, carboxyl-containing polymers are used.

* * * * *